(12) United States Patent
Hu et al.

(10) Patent No.: US 10,389,702 B2
(45) Date of Patent: Aug. 20, 2019

(54) ENTITY AUTHENTICATION METHOD AND DEVICE WITH ELLIPTIC CURVE DIFFIE HELLMAN (ECDH) KEY EXCHANGE CAPABILITY

(71) Applicant: CHINA IWNCOMM CO., LTD., Shaanxi (CN)

(72) Inventors: Yanan Hu, Shaanxi (CN); Zhiqiang Du, Shaanxi (CN); Qin Li, Shaanxi (CN); Ming Li, Shaanxi (CN)

(73) Assignee: CHINA IWNCOMM CO., LTD., Shaanci (CN)

( * ) Notice: Subject to any disclaimer, the term of this patent is extended or adjusted under 35 U.S.C. 154(b) by 324 days.

(21) Appl. No.: 15/122,806

(22) PCT Filed: Mar. 27, 2015

(86) PCT No.: PCT/CN2015/075285
§ 371 (c)(1),
(2) Date: Aug. 31, 2016

(87) PCT Pub. No.: WO2015/149658
PCT Pub. Date: Oct. 8, 2015

(65) Prior Publication Data
US 2017/0085557 A1    Mar. 23, 2017

(30) Foreign Application Priority Data

Mar. 31, 2014   (CN) .......................... 2014 1 0126328

(51) Int. Cl.
*H04L 29/06*     (2006.01)
*H04L 9/00*      (2006.01)
(Continued)

(52) U.S. Cl.
CPC .......... *H04L 63/0823* (2013.01); *H04L 9/006* (2013.01); *H04L 9/0844* (2013.01);
(Continued)

(58) Field of Classification Search
None
See application file for complete search history.

(56) References Cited

U.S. PATENT DOCUMENTS 6,367,009 B1 * 4/2002 Davis .................. H04L 63/0442
                                                713/152
8,392,710 B2    3/2013 Tie et al.
(Continued)

FOREIGN PATENT DOCUMENTS

CN    101159639 A    4/2008
CN    101165701 A    4/2008
(Continued)

OTHER PUBLICATIONS

Technical specification of NFC security Part 2: Security Mechanism Requirements, ISO/IED 13157-2:2010; Translation attached.
(Continued)

*Primary Examiner* — Farid Homayounmehr
*Assistant Examiner* — Olanrewaju J. Bucknor
(74) *Attorney, Agent, or Firm* — Arent Fox LLP; Michael Fainberg (57) ABSTRACT

Disclosed are an entity authentication method and device, involving: sending, by an entity A, a first identity authentication message to an entity B; inspecting, by the entity B after receiving the first message, the validity of a certificate of the entity A; sending, by the entity B, a second identity authentication message to the entity A; inspecting, by the entity A after receiving the second message, the correctness of field data therein; calculating, by the entity A, a secret information and message authentication code using a private key thereof and a temporary public key of the entity B, and sending a third message to the entity B; inspecting, by the entity B after receiving the third message, the correctness of field data therein; calculating, by the entity B, a secret
(Continued)

information and message authentication code using a private key thereof and a public key of the entity A.

16 Claims, 1 Drawing Sheet

(51) Int. Cl.
*H04L 9/32* (2006.01)
*H04L 9/08* (2006.01)

(52) U.S. Cl.
CPC .......... *H04L 9/3252* (2013.01); *H04L 9/3265* (2013.01); *H04L 9/3273* (2013.01); *H04L 63/062* (2013.01); *H04L 63/068* (2013.01); *H04L 63/102* (2013.01); *H04L 63/123* (2013.01); *H04L 2209/805* (2013.01)

(56) References Cited

U.S. PATENT DOCUMENTS

| | | | | |
|---|---|---|---|---|
| 8,503,679 | B2* | 8/2013 | Bugbee | H04L 9/0841 380/255 |
| 8,560,847 | B2* | 10/2013 | Pang | H04L 9/321 380/279 |
| 8,638,940 | B2* | 1/2014 | Chabanne | H04L 9/3271 380/277 |
| 8,683,194 | B2* | 3/2014 | Battistello | H04L 9/083 713/155 |
| 8,971,540 | B2* | 3/2015 | McCusker | H04L 9/006 380/286 |
| 2006/0143453 | A1* | 6/2006 | Imamoto | H04L 9/3273 713/169 |
| 2007/0005955 | A1* | 1/2007 | Pyle | H04L 9/3228 713/156 |
| 2008/0313464 | A1 | 12/2008 | Fascenda et al. | |
| 2009/0094372 | A1 | 4/2009 | Nyang et al. | |
| 2010/0153731 | A1* | 6/2010 | Duc | H04L 9/3271 713/175 |
| 2010/0191967 | A1* | 7/2010 | Fujii | G06F 21/32 713/169 |
| 2011/0078438 | A1* | 3/2011 | Tie | H04L 9/0844 713/155 |
| 2012/0096273 | A1* | 4/2012 | Campagna | H04L 9/3066 713/176 |
| 2012/0237030 | A1* | 9/2012 | Ghouti | H04L 9/3066 380/255 |
| 2013/0227297 | A1* | 8/2013 | Gantman | H04L 9/3013 713/176 |
| 2013/0239174 | A1 | 9/2013 | Asano et al. | |
| 2014/0189359 | A1* | 7/2014 | Marien | H04L 9/3228 713/172 |
| 2015/0143125 | A1* | 5/2015 | Nix | H04W 4/70 713/171 |
| 2016/0021536 | A1* | 1/2016 | Teruyama | H04W 76/10 713/169 |

FOREIGN PATENT DOCUMENTS

| | | |
|---|---|---|
| CN | 101242323 A | 8/2008 |
| CN | 101286844 A | 10/2008 |
| CN | 101364875 A | 2/2009 |
| CN | 101364876 A | 2/2009 |
| CN | 100544249 C | 9/2009 |
| CN | 101645899 A | 2/2010 |
| CN | 101754213 A | 6/2010 |
| CN | 101853369 A | 10/2010 |
| CN | 101984577 A | 3/2011 |
| CN | 102014386 A | 4/2011 |
| EP | 1526677 A | 4/2004 |
| EP | 2073430 A | 6/2009 |
| EP | 2234366 A1 | 9/2009 |
| EP | 2211498 A | 7/2010 |
| WO | 2009139629 A1 | 11/2009 |

OTHER PUBLICATIONS

IPA Information-technology Promotion Agency; date of publication: Mar. 2003, p. No. pp. 13-18 Translation attached.
International Search Report for PCT/CN2015/075285 dated Jul. 8, 2015.
Information Technology Telecommunications and Information Exchange Between Systems, NFC Security Part 1: NFCIP-1 Security Services and Protocol. Jan. 20, 2014, pp. 1-13.
Extended European Search Report for PCT/CN2015075285 dated Mar. 3, 2017.
Research on Authentication and key Exchange Protocol for RFID System, School of Information Security Engineering, Jan. 18, 2010.

* cited by examiner

ENTITY AUTHENTICATION METHOD AND DEVICE WITH ELLIPTIC CURVE DIFFIE HELLMAN (ECDH) KEY EXCHANGE CAPABILITY

This application is a National Stage of International Application No. PCT/CN2015/075285, filed on Mar. 27, 2015, designating the United States and claiming priority to Chinese Patent Application No. 201410126328.8, filed with the Chinese Patent Office on Mar. 31, 2014 and entitled "A method and apparatus for authenticating an entity", the content of which is hereby incorporated by reference in its entirety.

FIELD

The present invention relates to the field of network security, and particularly to a method and apparatus for authenticating an entity.

BACKGROUND

Communication is conducted via an air interface in the technology of Near Field Communication (NFC) without any physical or tangible contact, and this technology has suffered from a variety of security threats while being widely applied, for example, an attacker may eavesdrop and illegally intercept information exchanged between two communication parties; duplicate or counterfeit to impersonate a legal card; remotely read confidential information in a card using a card reader with high radio frequency power, and then crack using a backend server for the purpose of illegally retrieving the information in the card, etc. In view of these attacks, the technology of NFC shall be provided with an anti-counterfeiting capability to apply a mechanism of authenticating the identities of two communication parties to thereby authenticate the identities of the card and the reader so as to guarantee the legality and authenticity of the identities of the two communication parties. However the identity authentication mechanism has been absent in the existing technology of NFC air interface communication, thus resulting in significant security risks.

SUMMARY

Embodiments of the invention propose a method and apparatus for authenticating an entity so as to address the problem in the prior art.

A method for authenticating an entity includes:

the operation 1 of transmitting, by an entity A, a first identity authentication message including $N_A \parallel Cert_A$ to an entity B, wherein $N_A$ represents a random number generated by the entity A, and $Cert_A$ represents a certificate of the entity A;

the operation 2 of checking, by the entity B, for validity of the certificate $Cert_A$ in the first identity authentication message from the entity A upon reception of the first identity authentication message, and if the certificate is invalid, then terminating the authentication;

the operation 3 of generating, by the entity B, a random number $N_B$, and calculating a digital signature $Sig_B = SIG(CS_B, ID_A \parallel ID_B \parallel N_A \parallel N_B \parallel q_B)$ using its own private key $CS_B$, wherein SIG represents a digital signature algorithm, $ID_A$ and $ID_B$ represent identification information of the entity A and the entity B respectively, $Q_B$ represents a temporary public key of the entity B, and transmitting, by the entity B, a second identity authentication message including $N_A \parallel N_B \parallel Cert_B \parallel Q_B \parallel Sig_B$ to the entity A, wherein $Cert_B$ represents a certificate of the entity B;

the operation 4 of checking, by the entity A, for correctness of field data in the second identity authentication message including $N_A \parallel N_B \parallel Cert_B \parallel Q_B \parallel Sig_B$ from the entity B upon reception of the second identity authentication message, and if the field data are incorrect as a result of the check, then terminating the authentication;

the operation 5 of calculating, by the entity A, a digital signature $Sig_A = SIG(CS_A, ID_A \parallel ID_B \parallel N_A \parallel N_B \parallel Q_A)$ of the entity A using its own private key $CS_A$, wherein $Q_A$ represents a temporary public key of the entity A; and checking, by the entity A, to see whether the temporary public key $Q_B$ of the entity B has been stored, and if so, then using the stored $Q_B$; otherwise, checking $Q_B$ in the received second identity authentication message for validity, and if $Q_B$ is valid, then using $Q_B$ in the received second identity authentication message; if $Q_B$ is invalid, then terminating the authentication;

the operation 6 of calculating, by the entity A, secret information $z = f(d_A, Q_B)$ using a temporary private key $d_A$ generated in advance by the entity A, and the temporary public key $Q_B$ of the entity B based on the Elliptic Curve Diffie Hellman (ECDH) key exchange protocol, wherein f represents a key calculation function, and if the secret information is calculated in error, then terminating, by the entity A, the authentication; otherwise, converting the calculated secret information z into a string of characters Z, and calculating a key $MK = KDF(N_A, N_B, Z, ID_A, ID_B)$, wherein KDF represents a key derivation algorithm, calculating, by the entity A, a message authentication code $MacTag_A = MAC1(MK, ID_A, ID_B, Q_A, Q_B)$, wherein MAC1 represents a message authentication code calculation function, and transmitting, by the entity A, a third identity authentication message including $N_A \parallel N_B \parallel Q_A \parallel Sig_A \parallel MacTag_A$ to the entity B;

the operation 7 of checking, by the entity B, for correctness of field data in the third identity authentication message including $N_A \parallel N_B \parallel Q_A \parallel Sig_A \parallel MacTag_A$ from the entity A upon reception of the third identity authentication message, and if the field data are incorrect as a result of the check, then terminating the authentication;

the operation 8 of checking, by the entity B, to see whether the temporary public key $Q_A$ of the entity A has been stored, and if so, then using the stored $Q_A$; otherwise, checking $Q_A$ in the received third identity authentication message for validity, and if $Q_A$ is valid, then using $Q_A$ in the received third identity authentication message; if $Q_A$ is invalid, then terminating the authentication;

the operation 9 of calculating, by the entity B, secret information $z = f(d_B, Q_A)$ using a temporary private key $d_B$ generated in advance by the entity B, and the temporary public key $Q_A$ of the entity A based on the ECDH key exchange protocol, and if the secret information is calculated in error, then terminating the authentication; otherwise, converting the calculated secret information z into a string of characters Z, calculating a key $MK = KDF(N_A, N_B, Z, ID_A, ID_B)$, calculating a message authentication code MacTag.sub.A=MAC1(MK, ID.sub.A, ID.sub.B, Q.sub.A, Q.sub.B), and comparing it with MacTag.sub.A in the received third identity authentication message transmitted by the entity A, and if they are not consistent, then terminating the authentication; otherwise, determining that the entity A is legal, calculating a message authentication code MacTag.sub.B=MAC1(MK, ID.sub.B, ID.sub.A, Q.sub.B, Q.sub.A), and transmitting a fourth identity authentication message including MacTag.sub.B to the entity A; and the operation 10 of calculating, by the entity A, MacTag.sub.B=MAC1(MK, ID.sub.B, ID.sub.A, Q.sub.B, Q.sub.A) upon reception of the fourth identity authentication message from the entity B, and comparing it with MacTag.sub.B in the received fourth identity authentication message, and if they are not consistent, then determining that the entity B is illegal; if they are consistent, then determining that the entity B is legal.

An operating method of an entity A while performing entity authentication with an entity B includes the operations of:

generating a random number $N_A$, and transmitting a first identity authentication message including $N_A \| Cert_A$ to the entity B, wherein $Cert_A$ represents a certificate of the entity A;

checking for correctness of field data in a second identity authentication message including $N_A \| N_B \| Cert_B \| Q_B \| Sig_B$ from the entity B upon reception of the second identity authentication message, and if the field data are incorrect as a result of the check, then terminating the authentication;

calculating a digital signature $Sig_A = SIG(CS_A, ID_A \| ID_B \| N_A \| N_B \| Q_A)$ using its own private key $CS_A$ and temporary public key $Q_A$, and checking to see whether a temporary public key $Q_B$ of the entity B has been stored, and if so, then using the stored $Q_B$; otherwise, checking $Q_B$ in the received second identity authentication message for validity, and if $Q_B$ is valid, then using $Q_B$ in the received second identity authentication message; if $Q_B$ is invalid, then terminating the authentication;

calculating secret information $z=f(d_A, Q_B)$ using a temporary private key $d_A$ generated in advance, and the temporary public key $Q_B$ of the entity B based on the ECDH key exchange protocol, and if the secret information is calculated in error, then terminating the authentication; otherwise, converting the calculated secret information z into a string of characters Z, calculating a key $MK=KDF(N_A, N_B, Z, ID_A, ID_B)$, and calculating a message authentication code $MacTag_A=MAC1(MK, ID_A, ID_B, Q_A, Q_B)$, and transmitting a third identity authentication message including $N_A \| N_B \| Q_A \| Sig_A \| MacTag_A$ to the entity B; and calculating $MacTag_B=MAC1(MK, ID_B, ID_A, Q_B, Q_A)$ upon reception of a fourth identity authentication message from the entity B, and comparing it with $MacTag_B$ in the received fourth identity authentication message, and if they are not consistent, then determining that the entity B is illegal; if they are consistent, then determining that the entity B is legal;

wherein SIG represents a digital signature algorithm, $ID_A$ represents the identifier of the entity A, $ID_B$ represents the identifier of the entity B, f represents a key calculation function, KDF represents a key derivation function, and MAC1 is a message authentication code calculation function.

An operating method of an entity B while performing entity authentication with an entity A includes the operations of:

checking for validity of a certificate $Cert_A$ in a first identity authentication message including $N_A \| Cert_A$ from the entity A upon reception of the first identity authentication message, and if the certificate is invalid, then terminating the authentication; otherwise, generating a random number $N_B$, calculating a digital signature $Sig_B=SIG(CS_B, ID_A \| ID_B \| N_A \| N_B \| Q_B)$ using its own private key $CS_B$ and temporary public key $Q_B$, and transmitting a second identity authentication message including $N_A \| N_B Cert_B \| Q_B \| Sig_B$ to the entity A, wherein $Cert_B$ represents the certificate;

checking for correctness of field data in a third identity authentication message including $N_A \| N_B \| Q_A \| Sig_A \| MacTag_A$ from the entity A upon reception of the third identity authentication message, and if the field data in the third identity authentication message are incorrect as a result of the check, then terminating the authentication;

checking to see whether a temporary public key $Q_A$ of the entity A has been stored, and if so, then using the stored $Q_A$; otherwise, checking $Q_A$ in the received third identity authentication message for validity, and if $Q_A$ is valid, then using $Q_A$ in the received third identity authentication message; if $Q_A$ is invalid, then terminating the authentication; and calculating secret information $z=f(d_B, Q_A)$ using a temporary private key $d_B$ generated in advance, and the temporary public key $Q_A$ of the entity A based on the ECDH key exchange protocol, and if the secret information is calculated in error, then terminating the authentication; otherwise, converting the calculated secret information z into a string of characters Z, calculating a key $MK=KDF(N_A, N_B, Z, ID_A, ID_B)$, calculating a message authentication code $MacTag_A=MAC1(MK, ID_A, ID_B, Q_A, Q_B)$, and comparing it with $MacTag_A$ in the received third identity authentication message transmitted by the entity A, and if they are not consistent, then terminating the authentication; otherwise, determining that the entity A is legal, calculating a message authentication code $MacTag_B=MAC1(MK, ID_B, ID_A, Q_B, Q_A)$, and transmitting a fourth identity authentication message including $MacTag_B$ to the entity A;

wherein SIG represents a digital signature algorithm, $ID_A$ represents the identifier of the entity A, $ID_B$ represents the identifier of the entity B, f represents a key calculation function, KDF represents a key derivation function, and MAC1 is a message authentication code calculation function.

An apparatus for authenticating an entity with another apparatus includes a memory unit, a processing unit, and a transceiver unit, wherein:

the memory unit is configured to store a certificate $Cert_A$ and a private key $CS_A$ of the apparatus;

the processing unit is configured to generate a random number $N_A$, a temporary private key $d_A$, and a temporary public key $Q_A$;

the transceiver unit is configured to transmit a first identity authentication message including $N_A \| Cert_A$ to the other apparatus, and to receive a second identity authentication message including $N_A \| N_B \| Cert_B \| Q_B \| Sig_B$ transmitted by the other apparatus;

the processing unit is further configured to check the received second identity authentication message including $N_A \| N_B \| Cert_B \| Q_B \| Sig_B$ from the other apparatus, and if the second identity authentication message is incorrect as a result of the check, to terminate the authentication;

the processing unit is further configured to calculate a digital signature $Sig_A=SIG(CS_A, ID_A \| ID_B \| N_A \| N_B \| Q_A)$ using the private key $CS_A$ and the temporary public key $Q_A$;

the processing unit is further configured to check to see whether a temporary public key $Q_B$ of the other apparatus has been stored, and if so, to use the stored $Q_B$; otherwise, to check $Q_B$ in the received second identity authentication message for validity, and if $Q_B$ is valid, to use $Q_B$ in the received second identity authentication message; if $Q_B$ is invalid, to terminate the authentication;

the processing unit is further configured to calculate secret information $z=f(d_A, Q_B)$ using $d_A$, and the temporary public key $Q_B$ of the other apparatus based on the ECDH key exchange protocol, and if the secret information is calculated correctly, to convert the calculated secret information z into a string of characters Z, to calculate a key $MK=KDF(N_A, N_B, Z, ID_A, ID_B)$, and to calculate a message authentication code $MacTag_A=MAC1(MK, ID_A, ID_B, Q_A, Q_B)$;

the transceiver unit is further configured to transmit a third identity authentication message including $N_A\|N_B\|Q_A\|Sig_A\|MacTag_A$ to the other apparatus, and to receive a fourth identity authentication message including $MacTag_B$ transmitted by the other apparatus; and the processing unit is further configured to calculate $MacTag_B=MAC1(MK, ID_B, ID_A, Q_B, Q_A)$, to compare the calculated $MacTag_B$ with $MacTag_B$ transmitted by the other apparatus, and if they are consistent, to determine that the identity of the other apparatus is legal; and wherein SIG represents a digital signature algorithm, $ID_A$ represents the identifier of the apparatus, $ID_B$ represents the identifier of the other apparatus, f represents a key calculation function, KDF represents a key derivation function, and MAC1 is a message authentication code calculation function.

An apparatus for authenticating an entity with another apparatus includes a memory unit, a processing unit, and a transceiver unit, wherein:

the memory unit is configured to store a certificate $Cert_B$ and a private key $CS_B$ of the apparatus;

the processing unit is configured to generate a random number $N_B$, a temporary private key $d_B$, and a temporary public key $Q_B$;

the transceiver unit is configured to receive a first identity authentication message including $N_A\|Cert_A$ from the other apparatus;

the processing unit is configured to check for validity of a certificate $Cert_A$ in the received first identity authentication message from the other apparatus, and if the certificate is invalid, to terminate the authentication; and to calculate a digital signature $Sig_B=SIG(CS_B, ID_A\|ID_B\|N_A\|N_B\|Q_B)$ using the private key $CS_B$ and the temporary public key $Q_B$;

the transceiver unit is further configured to transmit a second identity authentication message including $N_A\|N_B\|Cert_B\|Q_B\|Sig_B$ to the other apparatus, and to receive a third identity authentication message including $N_A\|N_B\|Q_A\|Sig_A\|MacTag_A$ transmitted by the other apparatus;

the processing unit is further configured to check the received third identity authentication message including $N_A\|N_B\|Q_A\|Sig_A\|MacTag_A$, and if the third identity authentication message is incorrect as a result of the check, to terminate the authentication;

the processing unit is further configured to check to see whether a temporary public key $Q_A$ of the other apparatus has been stored, and if so, to use the stored $Q_A$; otherwise, to check $Q_A$ in the received third identity authentication message for validity, and if $Q_A$ is valid, to use $Q_A$ in the received third identity authentication message; if $Q_A$ is invalid, to terminate the authentication; and the processing unit is further configured to calculate secret information $z=f(d_B, Q_A)$ using the temporary private key $d_B$, and the temporary public key $Q_A$ of the other apparatus based on the ECDH key exchange protocol, and if the secret information is calculated correctly, to convert the calculated secret information z into a string of characters Z, to calculate a key $MK=KDF(N_A, N_B, Z, ID_A, ID_B)$, to calculate a message authentication code $MacTag_A=MAC1(MK, ID_A, ID_B, Q_A, Q_B)$, and to compare the calculated $MacTag_A$ with $MacTag_A$ transmitted by the other apparatus, and if they are consistent, to determine that the identity of the other apparatus is legal, and to calculate a message authentication code $MacTag_B=MAC1(MK, ID_B, ID_A, Q_B, Q_A)$; and the transceiver unit is further configured to transmit a fourth identity authentication message including $MacTag_B$ to the other apparatus;

wherein SIG represents a digital signature algorithm, $ID_A$ represents the identifier of the other apparatus, $ID_B$ represents the identifier of the apparatus, f represents a key calculation function, KDF represents a key derivation function, and MAC1 is a message authentication code calculation function.

An advantageous effect of the invention lies in that:

The invention can provide the identity authentication mechanism for air interface communication devices including NFC devices to guarantee the legality and authenticity of the identities of the two communication parties, and can be widely applied in various fields.

BRIEF DESCRIPTION OF THE DRAWINGS

The drawings described here are intended to provide further understanding of the invention, and these drawings constitute a part of the invention, but are not intended to limit the invention. In the drawings.

DETAILED DESCRIPTION OF THE EMBODIMENTS

Figure 1:
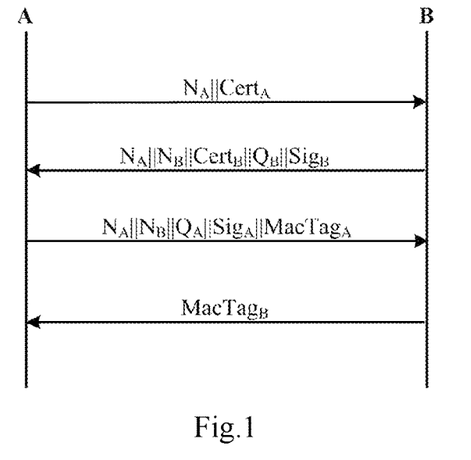
FIG. 1 illustrates a schematic flow chart of a method for authenticating an entity according to an embodiment of the invention.

Embodiments of the invention provide a method and apparatus for authenticating an entity. The invention relates to an entity A and an entity B, and prior to authentication, the two communication parties including the entity A and the entity B have their respective certificates $Cert_A$ and $Cert_B$, private keys $CS_A$ and $CS_B$, and a capability to authenticate the certificates of each other for legality, and have obtained identification information of each other. Referring to FIG. 1, a method for authenticating an entity according to an embodiment of the invention includes the following operations:

In the operation 1, an entity A transmits a first identity authentication message including $N_A\|Cert_A$ to an entity B, where $N_A$ represents a random number generated by the entity A, and $Cert_A$ represents a certificate of the entity A. "∥" here represents concatenation between fields without limiting a sequential order of the fields. Moreover in the invention, the fields concatenated by "∥" can be regarded as a "group of fields". It shall be noted that the "group of fields" in the invention is open in that one or more fields other than the fields in the "group of fields" exemplified in the embodiments of the invention may also be included into the "group of fields".

In the operation 2, the entity B checks for validity of the certificate $Cert_A$ in the first identity authentication message from the entity A upon reception of the first identity authentication message, and if the certificate is invalid, then the entity B may terminate the authentication.

In the operation 3, the entity B generates a random number $N_B$, and calculates a digital signature $Sig_B=SIG(CS_B, ID_A\|N_B\|Q_B)$ using its own private key $CS_B$, where SIG represents a digital signature algorithm, $ID_A$ and $ID_B$ represent identification information of the entity A and the entity B respectively, $Q_B$ represents a temporary public key of the entity B, and the entity B transmits a second identity authentication message including $N_A\|N_B\|Cert_B\|Q_B\|Sig_B$ to the entity A, where $Cert_B$ represents a certificate of the entity B.

In the operation 4, the entity A checks for correctness of field data in the second identity authentication message including $N_A\|N_B\|Cert_B\|Q_B\|Sig_B$ from the entity B upon reception of the second identity authentication message, and if the field data are incorrect as a result of the check, then the entity A may terminate the authentication.

In the operation 5, the entity A calculates a digital signature $Sig_A=SIG(CS_A, ID_A\|ID_B\|N_A\|N_B\|Q_A)$ using its own private key $CS_A$, where $Q_A$ represents a temporary public key of the entity A. The entity A checks to see whether the temporary public key $Q_B$ of the entity B has been stored, and if so, then the entity A may use the stored $Q_B$; otherwise, the entity A may check $Q_B$ in the received second identity authentication message for validity, and if $Q_B$ is valid, then the entity A may use $Q_B$ in the received second identity authentication message; if $Q_B$ is invalid, then the entity A may terminate the authentication.

In the operation 6, the entity A calculates secret information $z=f(d_A, Q_B)$ using a temporary private key $d_A$ generated in advance by the entity A, and the temporary public key $Q_B$ of the entity B based on the ECDH key exchange protocol, where f represents a key calculation function, and if the secret information is calculated in error, then the entity A may terminate the authentication; otherwise, the entity A may convert the calculated secret information z into a string of characters Z, and calculate a key $MK=KDF(N_A, N_B, Z, ID_A, ID_B)$, where KDF represents a key derivation algorithm, the entity A may calculate a message authentication code $MacTag_A=MAC1(MK, ID_A, ID_B, Q_A, Q_B)$, where MAC1 represents a message authentication code calculation function, and the entity A may transmit a third identity authentication message including $N_A\|N_B\|Q_A\|Sig_A\|MacTag_A$ to the entity B.

In the operation 7, the entity B checks for correctness of field data in the third identity authentication message including $N_A\|N_B\|Q_A\|Sig_A\|MacTag_A$ from the entity A upon reception of the third identity authentication message, and if the field data in the third identity authentication message are incorrect as a result of the check, then the entity B may terminate the authentication.

In the operation 8, the entity B checks to see whether the temporary public key $Q_A$ of the entity A has been stored, and if so, then the entity B may use the stored $Q_A$; otherwise, the entity B may check $Q_A$ in the received third identity authentication message for validity, and if $Q_A$ is valid, then the entity B may use $Q_A$ in the received third identity authentication message; if $Q_A$ is invalid, then the entity B may terminate the authentication.

In the operation 9, the entity B calculates secret information $z=f(d_B, Q_A)$ using a temporary private key $d_B$ generated in advance by the entity B, and the temporary public key $Q_A$ of the entity A based on the ECDH key exchange protocol, and if the secret information is calculated in error, then the entity B may terminate the authentication; otherwise, the entity B may convert the calculated secret information z into a string of characters Z, calculate a key $MK=KDF(N_A, N_B, Z, ID_A, ID_B)$, calculate a message authentication code $MacTag_A=MAC1(MK, ID_A, ID_B, Q_A, Q_B)$, and compare it with $MacTag_A$ in the received third identity authentication message transmitted by the entity A, and if they are not consistent, then the entity B may terminate the authentication; otherwise, the entity B may determine that the entity A is legal, calculate a message authentication code $MacTag_B=MAC1(MK, ID_B, ID_A, Q_B, Q_A)$, and transmit a fourth identity authentication message including $MacTag_B$ to the entity A.

In the operation 10, the entity A calculates $MacTag_B=MAC1(MK, ID_B, ID_A, Q_B, Q_A)$ upon reception of the fourth identity authentication message from the entity B, and compares it with $MacTag_B$ in the received fourth identity authentication message, and if they are not consistent, then the entity A may determine that the entity B is illegal; if they are consistent, then the entity A may determine that the entity B is legal.

So far the authentication ends.

Particularly in the operation 4 above, the entity A checks for correctness of the field data in the second identity authentication message including $N_A\|N_B\ Cert_B\|Q_B\|Sig_B$ from the entity B upon reception of the second identity authentication message as follows:

4.1. The entity A checks whether the random number $N_A$ in the received second identity authentication message is consistent with the random number $N_A$ transmitted by the entity A to the entity B, and if they are not consistent, then the field data may be incorrect as a result of the check;

4.2. The entity A checks $Cert_B$ in the second identity authentication message for validity, and if it is invalid, then the field data may be incorrect as a result of the check; and 4.3. The entity A verifies $Sig_B$ using a public key $CP_B$ of the entity B to check the entity B for legality, and if the entity B is not legal, then the field data may be incorrect as a result of the check, where the public key $CP_B$ of the entity B is included in the certificate $Cert_B$ of the entity B.

It shall be noted that the checks above will not be limited to any strictly required order, and if any one of the checks shows incorrectness, then it may be determined that $N_A\|N_B\|Cert_B\|Q_B\|Sig_B$ received by the entity A is incorrect as a result of the check.

Particularly in the operation 7 above, the entity B checks for correctness of the field data in the third identity authentication message including $N_A\|N_B\|Q_A\|Sig_A\|MacTag_A$ from the entity A upon reception of the third identity authentication message includes:

7.1. The entity B checks whether the random number $N_A$ in the received third identity authentication message is consistent with the lastly received random number $N_A$, and if they are not consistent, then the field data may be incorrect as a result of the check;

7.2. The entity B checks whether the random number $N_B$ in the received third identity authentication message is consistent with the random number $N_B$ transmitted by the entity B to the entity A, and if they are not consistent, then the field data may be incorrect as a result of the check; and 7.3. The entity B verifies $Sig_A$ using a public key $CP_A$ of the entity A to check the entity A for legality, and if the entity A is not legal, then the field data may be incorrect as a result of the check, where the public key $CP_A$ of the entity A is included in the certificate $Cert_A$ of the entity A.

It shall be noted that the checks above will not be limited to any strictly required order, and if any one of the checks shows incorrectness, then it may be determined that $N_A\|N_B\|Q_A\|Sig_A\|MacTag_A$ received by the entity B is incorrect as a result of the check.

Further to the method above for authenticating an entity, an embodiment of the invention further provides an operating method of the entity A in performing the method above, where the operating method includes the following operations:

The entity A generates a random number $N_A$, and transmits a first identity authentication message including $N_A\|Cert_A$ to the entity B, where $Cert_A$ represents a certificate of the entity A;

The entity A checks for correctness of field data in a second identity authentication message including $N_A\|N_B\|Cert_B\|Q_B\|Sig_B$ from the entity B upon reception of the second identity authentication message, and if the field data are incorrect as a result of the check, then the entity A may terminate the authentication;

The entity A calculates a digital signature $Sig_A=SIG(CS_A, ID_A\|ID_B\|N_A\|N_B\|Q_A)$ of the entity A using its own private key $CS_A$ and temporary public key $Q_A$, and checks to see whether a temporary public key $Q_B$ of the entity B has been stored, and if so, then the entity A may use the stored $Q_B$; otherwise, the entity A may check $Q_B$ in the received second identity authentication message for validity, and if $Q_B$ is valid, then the entity A may use $Q_B$ in the received second identity authentication message; if $Q_B$ is invalid, then the entity A may terminate the authentication;

The entity A calculates secret information $z=f(d_A, Q_B)$ using a temporary private key $d_A$ generated in advance, and the temporary public key $Q_B$ of the entity B based on the ECDH key exchange protocol, and if the secret information is calculated in error, then the entity A may terminate the authentication; otherwise, the entity A may convert the calculated secret information z into a string of characters Z, calculate a key $MK=KDF(N_A, N_B, Z, ID_A, ID_B)$, calculate a message authentication code $MacTag_A=MAC1(MK, ID_A, ID_B, Q_A, Q_B)$, and transmit a third identity authentication message including $N_A\|N_B\|Q_A\|Sig_A\|MacTag_A$ to the entity B; and The entity A calculates $MacTag_B=MAC1(MK, ID_B, ID_A, Q_B, Q_A)$ upon reception of a fourth identity authentication message from the entity B, and compares it with $MacTag_B$ in the received fourth identity authentication message, and if they are not consistent, then the entity A may determine that the entity B is illegal; if they are consistent, then the entity A may determine that the entity B is legal.

So far the authentication ends.

Here SIG represents a digital signature algorithm, $ID_A$ represents the identifier of the entity A, $ID_B$ represents the identifier of the entity B, f represents a key calculation function, KDF represents a key derivation function, and MAC1 is a message authentication code calculation function.

Particularly the entity A checks for correctness of the field data in the second identity authentication message including $N_A\|N_B\|Cert_B\|Q_B\|Sig_B$ from the entity B upon reception of the second identity authentication message as follows:

The entity A checks whether the random number $N_A$ in the received second identity authentication message is consistent with the random number $N_A$ transmitted by the entity A to the entity B, and if they are not consistent, then the field data may be incorrect as a result of the check;

The entity A checks $Cert_B$ in the second identity authentication message for validity, and if it is invalid, then the field data may be incorrect as a result of the check; and The entity A verifies $Sig_B$ using a public key $CP_B$ of the entity B to check the entity B for legality, and if the entity B is not legal, then the field data may be incorrect as a result of the check, where the public key $CP_B$ of the entity B is included in a certificate $Cert_B$ of the entity B.

It shall be noted that the checks above will not be limited to any strictly required order, and if any one of the checks shows incorrectness, then it may be determined that the received $N_A\|N_B\|Cert_B\|Q_B\|Sig_B$ is incorrect as a result of the check.

Further to the method above for authenticating an entity, an embodiment of the invention further provides an operating method for the entity B in performing the method, where the operating method includes the following operations:

The entity B checks for validity a certificate $Cert_A$ in a first identity authentication message including $N_A\|Cert_A$ from the entity A upon reception of the first identity authentication message, and if the certificate is invalid, then the entity B may terminate the authentication; otherwise, the entity B may generate a random number $N_B$, calculate a digital signature $Sig_B=SIG(CS_B, ID_A\|ID_B\|N_A\|N_B\|Q_B)$ using its own private key $CS_B$ and temporary public key $Q_B$, and transmit a second identity authentication message including $N_A\|N_B\|Cert_B\|Q_B\|Sig_B$ to the entity A, where $Cert_B$ represents the certificate;

The entity B checks for correctness of field data in a third identity authentication message including $N_A\|N_B\|Q_A\|Sig_A\|MacTag_A$ from the entity A upon reception of the third identity authentication message, and if the field data in the third identity authentication message are incorrect as a result of the check, then the entity B may terminate the authentication;

The entity B checks to see whether a temporary public key $Q_A$ of the entity A has been stored, and if so, then the entity B may use the stored $Q_A$; otherwise, the entity B may check $Q_A$ in the received third identity authentication message for validity, and if $Q_A$ is valid, then the entity B may use $Q_A$ in the received third identity authentication message; if $Q_A$ is invalid, then the entity B may terminate the authentication; and The entity B calculates secret information $z=f(d_B, Q_A)$ using a temporary private key $d_B$ generated in advance, and the temporary public key $Q_A$ of the entity A based on the ECDH key exchange protocol, and if the secret information is calculated in error, then the entity B may terminate the authentication; otherwise, the entity B may convert the calculated secret information z into a string of characters Z, calculate a key $MK=KDF(N_A, N_B, Z, ID_A, ID_B)$, calculate a message authentication code $MacTag_A=MAC1(MK, ID_A, ID_B, Q_A, Q_B)$, and compare it with $MacTag_A$ in the received third identity authentication message transmitted by the entity A, and if they are not consistent, then the entity B may terminate the authentication; otherwise, the entity B may determine that the entity A is legal, calculate a message authentication code $MacTag_B=MAC1(MK, ID_B, ID_A, Q_B, Q_A)$, and transmit a fourth identity authentication message including $MacTag_B$ to the entity A.

Here SIG represents a digital signature algorithm, $ID_A$ represents the identifier of the entity A, $ID_B$ represents the identifier of the entity B, f represents a key calculation function, KDF represents a key derivation function, and MAC1 is a message authentication code calculation function.

Particularly the entity B checks for correctness of the field data in the third identity authentication message including $N_A\|N_B\|Q_A\|Sig_A\|MacTag_A$ from the entity A upon reception of the third identity authentication message includes:

The entity B checks whether the random number $N_A$ in the received third identity authentication message is consistent with the lastly received random number $N_A$, and if they are not consistent, then the field data may be incorrect as a result of the check;

The entity B checks whether the random number $N_B$ in the received third identity authentication message is consistent with the random number $N_B$ transmitted by the entity B to the entity A, and if they are not consistent, then the field data may be incorrect as a result of the check; and The entity B verifies $Sig_A$ using a public key $CP_A$ of the entity A to check the entity A for legality, and if the entity A is not legal, then the field data may be incorrect as a result of the check, where the public key $CP_A$ of the entity A is included in the certificate $Cert_A$ of the entity A.

It shall be noted that the checks above will not be limited to any strictly required order, and if any one of the checks shows incorrectness, then it may be determined that the received $N_A\|N_B\|Q_A\|Sig_A\|MacTag_A$ is incorrect as a result of the check.

Figure 2:
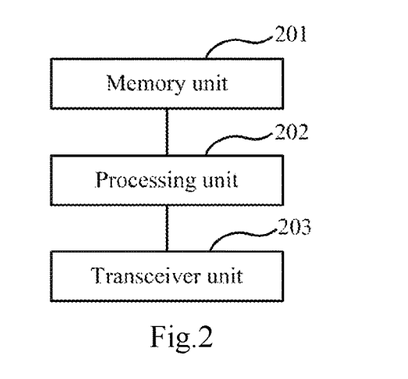
FIG. 2 illustrates a schematic structural diagram of an apparatus corresponding to an entity A according to an embodiment of the invention.

Referring to FIG. 2, further to the method above for authenticating an entity, an embodiment of the invention further provides an apparatus, corresponding to the entity A, for performing the method above, where the apparatus includes a memory unit 201, a processing unit 202, and a transceiver unit 203, where:

The memory unit 201 is configured to store a certificate $Cert_A$ and a private key $CS_A$;

The processing unit 202 is configured to generate a random number $N_A$, a temporary private key $d_A$, and a temporary public key $Q_A$;

The transceiver unit 203 is configured to transmit a first identity authentication message including $N_A\|Cert_A$ to the entity B, and to receive a second identity authentication message including $N_A\|N_B\|Cert_B\|Q_B\|Sig_B$ transmitted by the entity B;

The processing unit 202 is further configured to check the received second identity authentication message including $N_A\|N_B\|Cert_B\|Q_B\|Sig_B$ from the entity B, and if the second identity authentication message is incorrect as a result of the check, to terminate the authentication;

The processing unit 202 is further configured to calculate a digital signature $Sig_A=SIG(CS_A, ID_A\|ID_B\|N_A\|N_B\|Q_A)$ using the private key $CS_A$ and the temporary public key $Q_A$;

The processing unit 202 is further configured to check to see whether a temporary public key $Q_B$ of the other apparatus has been stored, and if so, to use the stored $Q_B$; otherwise, to check $Q_B$ in the received second identity authentication message for validity, and if $Q_B$ is valid, to use $Q_B$ in the received second identity authentication message; if $Q_B$ is invalid, to terminate the authentication;

The processing unit 202 is further configured to calculate secret information $z=f(d_A, Q_B)$ using $d_A$, and the temporary public key $Q_B$ of the entity B based on the ECDH key exchange protocol, and if the secret information is calculated correctly, to convert the calculated secret information z into a string of characters Z, to calculate a key $MK=KDF(N_A, N_B, Z, ID_A, ID_B)$, and to calculate a message authentication code $MacTag_A=MAC1(MK, ID_A, ID_B, Q_A, Q_B)$;

The transceiver unit 203 is further configured to transmit a third identity authentication message including $N_A\|N_B\|Q_A\|Sig_A\|MacTag_A$ to the entity B, and to receive a fourth identity authentication message including $MacTag_B$ transmitted by the entity B; and The processing unit 202 is further configured to calculate $MacTag_B=MAC1(MK, ID_B, ID_A, Q_B, Q_A)$, to compare the calculated $MacTag_B$ with $MacTag_B$ transmitted by the entity B, and if they are consistent, to determine that the identity of the entity B is legal; and Here SIG represents a digital signature algorithm, $ID_A$ represents the identifier of the apparatus, $ID_B$ represents the identifier of the entity B, f represents a key calculation function, KDF represents a key derivation function, and MAC1 is a message authentication code calculation function.

Particularly the processing unit 202 configured to check the received second identity authentication message including $N_A\|N_B\|Cert_B\|Q_B\|Sig_B$ from the entity B is configured:

To check whether the random number $N_A$ in the received second identity authentication message is consistent with the random number $N_A$ transmitted by the entity A to the entity B, and if they are not consistent, to determine the second identity authentication message is incorrect as a result of the check;

To check $Cert_B$ in the second identity authentication message for validity, and if it is invalid, to determine the second identity authentication message is incorrect as a result of the check; and To verify $Sig_B$ using a public key $CP_B$ of the entity B to check the entity B for legality, and if the entity B is not legal, to determine the second identity authentication message is incorrect as a result of the check, where the public key $CP_B$ of the entity B is included in a certificate $Cert_B$ of the entity B.

It shall be noted that the checks above will not be limited to any strictly required order, and if any one of the checks shows incorrectness, then it may be determined that the received $N_A\|N_B\|Cert_B\|Q_B\|Sig_B$ is incorrect as a result of the check.

Figure 3:
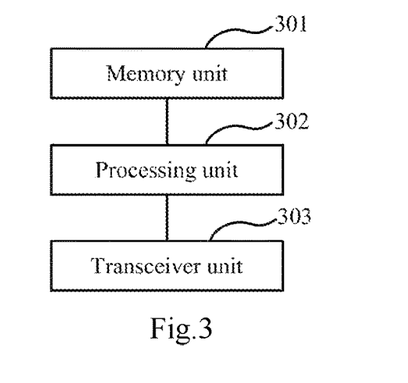
FIG. 3 illustrates a schematic structural diagram of an apparatus corresponding to an entity B according to an embodiment of the invention.

Referring to FIG. 3, further to the method above for authenticating an entity, an embodiment of the invention further provides an apparatus, corresponding to the entity B, for performing the method above, where the apparatus includes a memory unit 301, a processing unit 302, and a transceiver unit 303, where:

The memory unit 301 is configured to store a certificate $Cert_B$ and a private key $CS_B$;

The processing unit 302 is configured to generate a random number $N_B$, a temporary private key $d_B$, and a temporary public key $Q_B$;

The transceiver unit 303 is configured to receive a first identity authentication message including $N_A\|Cert_A$ from the entity A;

The processing unit 302 is configured to check for validity of a certificate $Cert_A$ in the received first identity authentication message from the entity A, and if the certificate is invalid, to terminate the authentication; and to calculate a digital signature $Sig_B=SIG(CS_B, ID_A\|ID_B\|N_A\|N_B\|Q_B)$ using the private key $CS_B$ and the temporary public key $Q_B$;

The transceiver unit 303 is further configured to transmit a second identity authentication message including $N_A\|N_B\|Cert_B\|Q_B\|Sig_B$ to the entity A, and to receive a third identity authentication message including $N_A\|N_B\|Q_A\|Sig_A\|MacTag_A$ transmitted by the entity A;

The processing unit 302 is further configured to check the received third identity authentication message including $N_A\|N_B\|Q_A\|Sig_A\|MacTag_A$, and if the third identity authentication message is incorrect as a result of the check, to terminate the authentication;

The processing unit 302 is further configured to check to see whether a temporary public key $Q_A$ of the other apparatus has been stored, and if so, to use the stored $Q_A$; otherwise, to check $Q_A$ in the received third identity authentication message for validity, and if $Q_A$ is valid, to use $Q_A$ in the received third identity authentication message; if $Q_A$ is invalid, to terminate the authentication; and The processing unit 302 is further configured to calculate secret information $z=f(d_B, Q_A)$ using the temporary private key $d_B$, and the temporary public key $Q_A$ of the entity A based on the ECDH key exchange protocol, and if the secret information is calculated correctly, to convert the calculated secret information z into a string of characters Z, to calculate a key $MK=KDF(N_A, N_B, Z, ID_A, ID_B)$, to calculate a message authentication code $MacTag_A=MAC1(MK, ID_A, ID_B, Q_A, Q_B)$, and to compare the calculated $MacTag_A$ with $MacTag_A$ transmitted by the entity A, and if they are consistent, to determine that the identity of the entity A is legal, and to calculate a message authentication code $MacTag_B=MAC1(MK, ID_B, ID_A, Q_B, Q_A)$; and The transceiver unit 303 is further configured to transmit a fourth identity authentication message including $MacTag_B$ to the entity A.

Here SIG represents a digital signature algorithm, $ID_A$ represents the identifier of the entity A, $ID_B$ represents the identifier of the entity B, f represents a key calculation function, KDF represents a key derivation function, and MAC1 is a message authentication code calculation function.

Particularly the processing unit 302 configured to check the received third identity authentication message including $N_A\|N_B\|Q_A\|Sig_A\|MacTag_A$ from the entity A upon reception of the third identity authentication message is configured:

To check whether the random number $N_A$ in the received third identity authentication message is consistent with the lastly received random number $N_A$, and if they are not consistent, to determine that the third identity authentication message is incorrect as a result of the check;

To check whether the random number $N_B$ in the received third identity authentication message is consistent with the random number $N_B$ transmitted by the entity B to the entity A, and if they are not consistent, to determine that the third identity authentication message is incorrect as a result of the check; and To verify $Sig_A$ using a public key $CP_A$ of the entity A to check the entity A for legality, and if the entity A is not legal, to determine that the third identity authentication message is incorrect as a result of the check, where the public key $CP_A$ of the entity A is included in the certificate $Cert_A$ of the entity A.

It shall be noted that the checks above will not be limited to any strictly required order, and if any one of the checks shows incorrectness, then it may be determined that the received $N_A\|N_B\|Q_A\|Sig_A\|MacTag_A$ is incorrect as a result of the check.

In summary, the embodiments of the invention enable identity authentication between entities with a function of negotiating about a key, and can be widely applied in various fields. The embodiments of the invention can be applicable to Radio Frequency Identification (RFID), a Wireless Sensor Network (WSN), Near Field Communication (NFC), a non-contact card, a Wireless Local Area Network (WLAN), and other fields of communication via an air interface. The entity A and the entity B can be a card reader and a tag in the field of RFID, nodes in the wireless sensor networks, terminal devices in the field of NFC, a card reader and a card in the field of non-contact cards, a terminal and an access point in the wireless local area network, etc.

Moreover in a preferred embodiment of the invention, if the technical solution according to the invention is applied to the field of NFC, then the entity A may transmit the first identity authentication message to the entity B after encapsulating it in an Activation Request (ACT_REQ) protocol data unit, the entity B may transmit the second identity authentication message to the entity A after encapsulating it in an Activation Response (ACT_RES) protocol data unit, the entity A may transmit the third identity authentication message to the entity B after encapsulating it in a Verification Request (VFY_REQ) protocol data unit, and the entity B may transmit the fourth identity authentication message to the entity A after encapsulating it in a Verification Response (VFY_RES) protocol data unit, where ACT_REQ, ACT_RES, VFY_REQ, and VFY_RES are protocol data unit formats defined in accordance with the standard ISO/IEC 13157-1. After the identity authentication messages are encapsulated as such, there will be better compatibility of technical solution according to the invention with other existing NFC security mechanisms.

Those skilled in the art shall appreciate that the embodiments of the invention can be embodied as a method, a system or a computer program product. Therefore the invention can be embodied in the form of an all-hardware embodiment, an all-software embodiment or an embodiment of software and hardware in combination. Furthermore the invention can be embodied in the form of a computer program product embodied in one or more computer useable storage mediums (including but not limited to a disk memory, a CD-ROM, an optical memory, etc.) in which computer useable program codes are contained.

The invention has been described in a flow chart and/or a block diagram of the method, the device (system) and the computer program product according to the embodiments of the invention. It shall be appreciated that respective flows and/or blocks in the flow chart and/or the block diagram and combinations of the flows and/or the blocks in the flow chart and/or the block diagram can be embodied in computer program instructions. These computer program instructions can be loaded onto a general-purpose computer, a specific-purpose computer, an embedded processor or a processor of another programmable data processing device to produce a machine so that the instructions executed on the computer or the processor of the other programmable data processing device create means for performing the functions specified in the flow(s) of the flow chart and/or the block(s) of the block diagram.

These computer program instructions can also be stored into a computer readable memory capable of directing the computer or the other programmable data processing device to operate in a specific manner so that the instructions stored in the computer readable memory create an article of manufacture including instruction means which perform the functions specified in the flow(s) of the flow chart and/or the block(s) of the block diagram.

These computer program instructions can also be loaded onto the computer or the other programmable data processing device so that a series of operational operations are performed on the computer or the other programmable data processing device to create a computer implemented process so that the instructions executed on the computer or the other programmable device provide operations for performing the functions specified in the flow(s) of the flow chart and/or the block(s) of the block diagram.

Although the preferred embodiments of the invention have been described, those skilled in the art benefiting from the underlying inventive concept can make additional modifications and variations to these embodiments. Therefore the appended claims are intended to be construed as encompassing the preferred embodiments and all the modifications and variations coming into the scope of the invention.

Evidently those skilled in the art can make various modifications and variations to the invention without departing from the spirit and scope of the invention. Thus the invention is also intended to encompass these modifications and variations thereto so long as the modifications and variations come into the scope of the claims appended to the invention and their equivalents.

The invention claimed is:

1. A method for authenticating a device, the method comprising:

transmitting, by a device A, a first identity authentication message comprising $N_A \| Cert_A$ to a device B, wherein $N_A$ represents a random number generated by the device A, and $Cert_A$ represents a certificate of the device A;

checking, by the device B, for validity of the certificate $Cert_A$ in the first identity authentication message from the device A upon reception of the first identity authentication message, and when the certificate is invalid, terminating the authentication;

generating, by the device B, a random number $N_B$, and calculating a digital signature $Sig_B = SIG(CS_B, ID_A \| ID_B \| N_A \| N_B \| Q_B)$ using the device B private key $CS_B$, wherein SIG represents a digital signature algorithm, $ID_A$ and $ID_B$ represent identification information of the device A and the device B respectively, $Q_B$ represents a temporary public key of the device B, and transmitting, by the device B, a second identity authentication message comprising $N_A \| N_B \| Cert_B \| Q_B \| Sig_B$ to the device A, wherein $Cert_B$ represents a certificate of the device B;

checking, by the device A, for correctness of field data in the second identity authentication message comprising $N_A \| N_B \| Cert_B \| Q_B \| Sig_B$ from the device B upon reception of the second identity authentication message, and when the field data are incorrect as a result of the check, terminating the authentication;

calculating, by the device A, a digital signature $Sig_A = SIG(CS_A, ID_A \| ID_B \| N_A \| N_B \| Q_A)$ of the device A using the device A private key $CS_A$, wherein $Q_A$ represents a temporary public key of the device A; and checking, by the device A, whether the temporary public key $Q_B$ of the device B has been stored, and when the temporary public key $Q_B$ of the device B has been stored, using the stored $Q_B$; when the temporary public key $Q_B$ of the device B has not been stored, checking $Q_B$ in the received second identity authentication message for validity, and when $Q_B$ is valid, using $Q_B$ in the received second identity authentication message; when $Q_B$ is invalid, terminating the authentication;

calculating, by the device A, secret information $z=f(d_A, Q_B)$ using a temporary private key $d_A$ generated in advance by the device A, and the temporary public key $Q_B$ of the device B based on an Elliptic Curve Diffie Hellman (ECDH) key exchange protocol, wherein f represents a key calculation function, and when the secret information is calculated in error, terminating, by the device A, the authentication; when the secret information is calculated in correct, converting the calculated secret information z into a string of characters Z, and calculating a key $MK=KDF(N_A, N_B, Z, ID_A, ID_B)$, wherein KDF represents a key derivation algorithm, calculating, by the device A, a message authentication code $MacTag_A = MAC1(MK, ID_A, ID_B, Q_A, Q_B)$, wherein MAC1 represents a message authentication code calculation function, and transmitting, by the device A, a third identity authentication message comprising $N_A \| N_B \| Q_A \| Sig_A \| MacTag_A$ to the device B;

checking, by the device B, for correctness of field data in the third identity authentication message comprising $N_A \| N_B \| Q_A \| Sig_A \| MacTag_A$ from the device A upon reception of the third identity authentication message, and when the field data are incorrect as a result of the check, terminating the authentication;

checking, by the device B, whether the temporary public key $Q_A$ of the device A has been stored, and when the temporary public key $Q_A$ of the device A has been stored, using the stored $Q_A$; when the temporary public key $Q_A$ of the device A has not been stored, checking $Q_A$ in the received third identity authentication message for validity, and when $Q_A$ is valid, then using $Q_A$ in the received third identity authentication message; when $Q_A$ is invalid, terminating the authentication;

calculating, by the device B, secret information $z=f(d_B, Q_A)$ using a temporary private key $d_B$ generated in advance by the device B, and the temporary public key $Q_A$ of the device A based on the ECDH key exchange protocol, and when the secret information is calculated in error, terminating the authentication; when the secret information is calculated in correct, converting the calculated secret information z into a string of characters Z, calculating a key $MK=KDF(N_A, N_B, Z, ID_A, ID_B)$, calculating a message authentication code $MacTag_A = MAC1(MK, ID_A, ID_B, Q_A, Q_B)$, and comparing the calculated message authentication code $MacTag_A = MAC1(MK, ID_A, ID_B, Q_A, Q_B)$ with $MacTag_A$ in the received third identity authentication message transmitted by the device A, and when they are not consistent, terminating the authentication; when they are consistent, determining that the device A is legal, calculating a message authentication code $MacTag_B = MAC1(MK, ID_B, ID_A, Q_B, Q_A)$, and transmitting a fourth identity authentication message comprising $MacTag_B$ to the device A; and calculating, by the device A, $MacTag_B = MAC1(MK, ID_B, ID_A, Q_B, Q_A)$ upon reception of the fourth identity authentication message from the device B, and comparing the calculated $MacTag_B = MAC1(MK, ID_B, ID_A, Q_B, Q_A)$ with $MacTag_B$ in the received fourth identity authentication message, and when they are not consistent, determining that the device B is illegal; when they are consistent, determining that the device B is legal.

2. The method according to claim 1, wherein the checking, by the device A, for correctness of the field data in the second identity authentication message comprising $N_A \| N_B \| Cert_B \| Q_B \| Sig_B$ from the device B upon reception of the second identity authentication message comprises:

checking, by the device A, whether the random number $N_A$ in the received second identity authentication message is consistent with the random number $N_A$ transmitted by the device A to the device B, and when they are not consistent, determining that the field data is not incorrect as a result of the check;

checking, by the device A, $Cert_B$ in the second identity authentication message for validity, and when the $Cert_B$ in the second identity authentication message is invalid, determining that the field data is not incorrect as a result of the check; and verifying, by the device A, $Sig_B$ using a public key $CP_B$ of the device B to check the device B for legality, and when the device B is not legal, determining that the field data is not incorrect as a result of the check, wherein the public key $CP_B$ of the device B is comprised in the certificate $Cert_B$ of the device B;

wherein when any one of the checks shows incorrectness, it is determined that $N_A\|N_B\|Cert_B\|Q_B\|Sig_B$ received by the device A is incorrect as a result of the check.

3. The method according to claim 1, wherein the checking, by the device B, for correctness of the field data in the third identity authentication message comprising $N_A\|N_B\|Q_A\|Sig_A\|MacTag_A$ from the device A upon reception of the third identity authentication message comprises:

checking, by the device B, whether the random number $N_A$ in the received third identity authentication message is consistent with the lastly received random number $N_A$, and when they are not consistent, determining that the field data is not incorrect as a result of the check;

checking, by the device B, whether the random number $N_B$ in the received third identity authentication message is consistent with the random number $N_B$ transmitted by the device B to the device A, and when they are not consistent, determining that the field data is not incorrect as a result of the check; and verifying, by the device B, $Sig_A$ using a public key $CP_A$ of the device A to check the device A for legality, and when the device A is not legal, determining that the field data is not incorrect as a result of the check, wherein the public key $CP_A$ of the device A is comprised in the certificate $Cert_A$ of the device A;

wherein when any one of the checks shows incorrectness, it is determined that $N_A\|N_B\|Q_A\|Sig_A\|MacTag_A$ received by the device B is incorrect as a result of the check.

4. The method according to claim 1, wherein the first identity authentication message is transmitted after being encapsulated in an Activation Request (ACT_REQ) protocol data unit, the second identity authentication message is transmitted after being encapsulated in an Activation Response (ACT_RES) protocol data unit, the third identity authentication message is transmitted after being encapsulated in a Verification Request (VEY_REQ) protocol data unit, and the fourth identity authentication message is transmitted after being encapsulated in a Verification Response (VEY_RES) protocol data unit, wherein ACT_REQ, ACT_RES, VEY_REQ, and VEY_RES are protocol data unit formats defined in accordance with the standard ISO/IEC 13157-1.

5. An operating method of a device A while performing device authentication with a device B, the method comprising:

generating a random number $N_A$, and transmitting a first identity authentication message comprising $N_A\|Cert_A$ to the device B, wherein $Cert_A$ represents a certificate of the device A;

checking for correctness of field data in a second identity authentication message comprising $N_A\|N_B\|Cert_B\|Q_B\|Sig_B$ from the device B upon reception of the second identity authentication message, and when the field data are incorrect as a result of the check, terminating the authentication;

calculating a digital signature $Sig_A=SIG(CS_A, ID_A\|ID_B\|N_A\|N_B\|Q_A)$ using the device A private key $CS_A$ and temporary public key $Q_A$, and checking whether a temporary public key $Q_B$ of the device B has been stored, and when the temporary public key $Q_B$ of the device B has been stored, using the stored $Q_B$; when the temporary public key $Q_B$ of the device B has not been stored, checking $Q_B$ in the received second identity authentication message for validity, and when $Q_B$ is valid, using $Q_B$ in the received second identity authentication message; when $Q_B$ is invalid, terminating the authentication;

calculating secret information $z=f(d_A, Q_B)$ using a temporary private key $d_A$ generated in advance, and the temporary public key $Q_B$ of the device B based on an Elliptic Curve Diffie Hellman (ECDH) key exchange protocol, and when the secret information is calculated in error, terminating the authentication; the secret information is calculated in correct, converting the calculated secret information z into a string of characters Z, calculating a key $MK=KDF(N_A, N_B, Z, ID_A, ID_B)$, and calculating a message authentication code $MacTag_A=MAC1(MK, ID_A, ID_B, Q_A, Q_B)$, and transmitting a third identity authentication message comprising $N_A\|N_B\|Q_A\|Sig_A\|MacTag_A$ to the device B; and calculating $MacTag_B=MAC1(MK, ID_B, ID_A, Q_B, Q_A)$ upon reception of a fourth identity authentication message from the device B, and comparing the calculated $MacTag_B=MAC1(MK, ID_B, ID_A, Q_B, Q_A)$ with $MacTag_B$ in the received fourth identity authentication message, and when they are not consistent, determining that the device B is illegal; when they are consistent, determining that the device B is legal;

wherein SIG represents a digital signature algorithm, $ID_A$ represents the identifier of the device A, $ID_B$ represents the identifier of the device B, f represents a key calculation function, KDF represents a key derivation function, and MAC1 is a message authentication code calculation function.

6. The method according to claim 5, wherein the checking for correctness of the field data in the second identity authentication message comprising $N_A\|N_B\|Cert_B\|Q_B\|Sig_B$ from the device B upon reception of the second identity authentication message comprises:

checking whether the random number $N_A$ in the received second identity authentication message is consistent with the random number $N_A$ transmitted by the device A to the device B, and when they are not consistent, determining that the field data is incorrect as a result of the check;

checking $Cert_B$ in the second identity authentication message for validity, and when the $Cert_B$ in the second identity authentication message is invalid, determining that the field data is incorrect as a result of the check; and verifying $Sig_B$ using a public key $CP_B$ of the device B to check the device B for legality, and when the device B is not legal, determining that the field data is incorrect as a result of the check, wherein the public key $Q_B$ of the device B is comprised in a certificate $Cert_B$ of the device B;

wherein when any one of the checks shows incorrectness, it is determined that the received $N_A\|N_B\|Cert_B\|Q_B\|Sig_B$ is incorrect as a result of the check.

7. The method according to claim 5, wherein the first identity authentication message is transmitted after being encapsulated in an Activation Request (ACT_REQ) protocol data unit, the second identity authentication message is transmitted after being encapsulated in an Activation Response (ACT_RES) protocol data unit, the third identity authentication message is transmitted after being encapsulated in a Verification Request (VEY_REQ) protocol data unit, and the fourth identity authentication message is transmitted after being encapsulated in a Verification Response (VEY_RES) protocol data unit, wherein ACT_REQ, ACT_RES, VEY_REQ, and VEY_RES are protocol data unit formats defined in accordance with the standard ISO/IEC 13157-1.

8. An operating method of a device B while performing device authentication with a device A, the method comprising:
   checking for validity of a certificate $Cert_A$ in a first identity authentication message comprising $N_A\|Cert_A$ from the device A upon reception of the first identity authentication message, and when the certificate is invalid, terminating the authentication; the certificate is valid, generating a random number $N_B$, calculating a digital signature $Sig_B=SIG(CS_B, ID_A\|ID_B\|N_A\|N_B\|Q_B)$ using the device B private key $CS_B$ and temporary public key $Q_B$, and transmitting a second identity authentication message comprising $N_A\|N_B\|Cert_B\|Q_B\|Sig_B$ to the device A, wherein $Cert_B$ represents the certificate;
   checking for correctness of field data in a third identity authentication message comprising $N_A\|N_B\|Q_A\|Sig_A\|MacTag_A$ from the device A upon reception of the third identity authentication message, and when the field data in the third identity authentication message are incorrect as a result of the check, terminating the authentication;
   checking whether a temporary public key $Q_A$ of the device A has been stored, and when the temporary public key $Q_A$ of the device A has been stored, using the stored $Q_A$; when the temporary public key $Q_A$ of the device A has not been stored, checking $Q_A$ in the received third identity authentication message for validity, and when $Q_A$ is valid, using $Q_A$ in the received third identity authentication message; when $Q_A$ is invalid, terminating the authentication; and
   calculating secret information $z=f(d_B, Q_A)$ using a temporary private key $d_B$ generated in advance, and the temporary public key $Q_A$ of the device A based on an Elliptic Curve Diffie Hellman (ECDH) key exchange protocol, and when the secret information is calculated in error, terminating the authentication; when the secret information is calculated in correct, converting the calculated secret information z into a string of characters Z, calculating a key $MK=KDF(N_A, N_B, Z, ID_A, ID_B)$, calculating a message authentication code $MacTag_A=MAC1(MK, ID_A, ID_B, Q_A, Q_B)$, and comparing the message authentication code $MacTag_A=MAC1(MK, ID_A, ID_B, Q_A, Q_B)$ with $MacTag_A$ in the received third identity authentication message transmitted by the device A, and when they are not consistent, terminating the authentication; when they are consistent, determining that the device A is legal, calculating a message authentication code $MacTag_B=MAC1(MK, ID_B, ID_A, Q_B, Q_A)$, and transmitting a fourth identity authentication message comprising $MacTag_B$ to the device A;
   wherein SIG represents a digital signature algorithm, $ID_A$ represents the identifier of the device A, $ID_B$ represents the identifier of the device B, f represents a key calculation function, KDF represents a key derivation function, and MAC1 is a message authentication code calculation function.

9. The method according to claim 8, wherein the checking for correctness of the field data in the third identity authentication message comprising $N_A\|N_B\|Q_A\|Sig_A\|MacTag_A$ from the device A upon reception of the third identity authentication message comprises:
   checking whether the random number $N_A$ in the received third identity authentication message is consistent with the lastly received random number $N_A$, and when they are not consistent, determining that the field data is incorrect as a result of the check;
   checking whether the random number $N_B$ in the received third identity authentication message is consistent with the random number $N_B$ transmitted by the device B to the device A, and when they are not consistent, determining that the field data is incorrect as a result of the check; and
   verifying $Sig_A$ using a public key $CP_A$ of the device A to check the device A for legality, and when the device A is not legal, determining that the field data is incorrect as a result of the check, wherein the public key $CP_A$ of the device A is comprised in the certificate $Cert_A$ of the device A;
   wherein when any one of the checks shows incorrectness, it is determined that the received $N_A\|N_B\|Q_A\|Sig_A\|MacTag_A$ is incorrect as a result of the check.

10. The method according to claim 8, wherein the first identity authentication message is transmitted after being encapsulated in an Activation Request (ACT_REQ) protocol data unit, the second identity authentication message is transmitted after being encapsulated in an Activation Response (ACT_RES) protocol data unit, the third identity authentication message is transmitted after being encapsulated in a Verification Request (VEY_REQ) protocol data unit, and the fourth identity authentication message is transmitted after being encapsulated in a Verification Response (VEY_RES) protocol data unit, wherein ACT_REQ, ACT_RES, VEY_REQ, and VEY_RES are protocol data unit formats defined in accordance with the standard ISO/IEC 13157-1.

11. An apparatus for performing entity authentication with another apparatus, the apparatus comprising at least one processor, a memory, and a transceiver, wherein the memory is configured to store readable program codes, a certificate $Cert_A$ and a private key $CS_A$ of the apparatus; and the at least one processor is configured to execute the readable program codes:
   to generate a random number $N_A$, a temporary private key $d_A$, and a temporary public key $Q_A$;
   to control the transceiver to transmit a first identity authentication message comprising $N_A\|Cert_A$ to the other apparatus, and to receive a second identity authentication message comprising $N_A\|N_B\|Cert_B\|Q_B\|Sig_B$ transmitted by the other apparatus;
   to check the received second identity authentication message comprising $N_A\|N_B\|Cert_B\|Q_B\|Sig_B$ from the other apparatus, and when the second identity authentication message is incorrect as a result of the check, to terminate the authentication;
   to calculate a digital signature $Sig_A=SIG(CS_A, ID_A\|ID_B\|N_A\|N_B\|Q_A)$ using the private key $CS_A$ and the temporary public key $Q_A$;
   to check whether a temporary public key $Q_B$ of the other apparatus has been stored, and when the temporary public key $Q_B$ of the other apparatus has been stored, to use the stored $Q_B$; when the temporary public key QB of the other apparatus has not been stored, to check $Q_B$ in the received second identity authentication message for validity, and when $Q_B$ is valid, to use $Q_B$ in the received second identity authentication message; when $Q_B$ is invalid, to terminate the authentication;

to calculate secret information $z=f(d_A, Q_B)$ using $d_A$, and the temporary public key $Q_B$ of the other apparatus based on an Elliptic Curve Diffie Hellman (ECDH) key exchange protocol, and when the secret information is calculated correctly, to convert the calculated secret information z into a string of characters Z, to calculate a key $MK=KDF(N_A, N_B, Z, ID_A, ID_B)$, and to calculate a message authentication code $MacTag_A=MAC1(MK, ID_A, ID_B, Q_A, Q_B)$;

to control the transceiver to transmit a third identity authentication message comprising $N_A\|N_B\|Q_A\|Sig_A\|MacTag_A$ to the other apparatus, and to receive a fourth identity authentication message comprising MacTagB transmitted by the other apparatus; and to calculate $MacTag_B=MAC1(MK, ID_B, ID_A, Q_B, Q_A)$, to compare the calculated $MacTag_B$ with $MacTag_B$ transmitted by the other apparatus, and when they are consistent, to determine that the identity of the other apparatus is legal; and wherein SIG represents a digital signature algorithm, $ID_A$ represents the identifier of the apparatus, $ID_B$ represents the identifier of the other apparatus, f represents a key calculation function, KDF represents a key derivation function, and MAC1 is a message authentication code calculation function.

12. The apparatus according to claim 11, wherein the at least one processor configured to execute the readable program codes to check the received second identity authentication message comprising $N_A\|N_B\|Cert_B\|Q_B\|Sig_B$ from the other apparatus is further configured:

to check whether the random number $N_A$ in the received second identity authentication message is consistent with the random number $N_A$ transmitted by the apparatus to the other apparatus, and when they are not consistent, to determine the second identity authentication message is incorrect as a result of the check;

to check $Cert_B$ in the second identity authentication message for validity, and when the $Cert_B$ in the second identity authentication message is invalid, to determine the second identity authentication message is incorrect as a result of the check; and to verify $Sig_B$ using a public key $CP_B$ of the other apparatus to check the other apparatus for legality, and when the other apparatus is not legal, to determine the second identity authentication message is incorrect as a result of the check, wherein the public key $CP_B$ of the other apparatus is comprised in a certificate $Cert_B$ of the other apparatus;

wherein when any one of the checks shows incorrectness, it is determined that the received $N_A\|N_B\|Cert_B\|Q_B\|Sig_B$ is incorrect as a result of the check.

13. The apparatus according to claim 11, wherein the first identity authentication message is transmitted after being encapsulated in an Activation Request (ACT_REQ) protocol data unit, the second identity authentication message is transmitted after being encapsulated in an Activation Response (ACT_RES) protocol data unit, the third identity authentication message is transmitted after being encapsulated in a Verification Request (VEY_REQ) protocol data unit, and the fourth identity authentication message is transmitted after being encapsulated in a Verification Response (VEY_RES) protocol data unit, wherein ACT_REQ, ACT_RES, VEY_REQ, and VEY_RES are protocol data unit formats defined in accordance with the standard ISO/IEC 13157-1.

14. An apparatus for performing entity authentication with another apparatus, the apparatus comprising at least one processor, a memory, and a transceiver, wherein the memory is configured to store readable program codes, a certificate $Cert_B$ and a private key $CS_B$ of the apparatus; and the at least one processor is configured to execute the readable program codes:

to generate a random number $N_B$, a temporary private key $d_B$, and a temporary public key $Q_B$;

to control the transceiver to receive a first identity authentication message comprising $N_A\|Cert_A$ from the other apparatus;

to check for validity of a certificate $Cert_A$ in the received first identity authentication message from the other apparatus, and when the certificate is invalid, to terminate the authentication; and to calculate a digital signature $Sig_B=SIG(CS_B, ID_A\|ID_B\|N_A\|N_B\|Q_B)$ using the private key $CS_B$ and the temporary public key $Q_B$;

to control the transceiver to transmit a second identity authentication message comprising $N_A\|N_B\|Cert_B\|Q_B\|Sig_B$ to the other apparatus, and to receive a third identity authentication message comprising $N_A\|N_B\|Q_A\|Sig_A\|MacTag_A$ transmitted by the other apparatus;

to check the received third identity authentication message comprising $N_A\|N_B\|Q_A\|Sig_A\|MacTag_A$, and when the third identity authentication message is incorrect as a result of the check, to terminate the authentication;

to check whether a temporary public key $Q_A$ of the other apparatus has been stored, and when the temporary public key $Q_A$ of the other apparatus has been stored, to use the stored $Q_A$; when the temporary public key $Q_A$ of the other apparatus has not been stored, to check QA in the received third identity authentication message for validity, and when $Q_A$ is valid, to use $Q_A$ in the received third identity authentication message; when $Q_A$ is invalid, to terminate the authentication; and to calculate secret information $z=f(d_B, Q_A)$ using the temporary private key $d_B$, and the temporary public key $Q_A$ of the other apparatus based on an Elliptic Curve Diffie Hellman (ECDH) key exchange protocol, and when the secret information is calculated correctly, to convert the calculated secret information z into a string of characters Z, to calculate a key $MK=KDF(N_A, N_B, Z, ID_A, ID_B)$, to calculate a message authentication code $MacTag_A=MAC1(MK, ID_A, ID_B, Q_A, Q_B)$, and to compare the calculated $MacTag_A=MAC1(MK, ID_A, ID_B, Q_A, Q_B)$ with $MacTag_A$ transmitted by the other apparatus, and when they are consistent, to determine that the identity of the other apparatus is legal, and to calculate a message authentication code $MacTag_B=MAC1(MK, ID_B, ID_A, Q_B, Q_A)$; and to control the transceiver to transmit a fourth identity authentication message comprising $MacTag_B$ to the other apparatus; and wherein SIG represents a digital signature algorithm, $ID_A$ represents the identifier of the other apparatus, $ID_B$ represents the identifier of the apparatus, f represents a key calculation function, KDF represents a key derivation function, and MAC1 is a message authentication code calculation function.

15. The apparatus according to claim 14, wherein the at least one processor configured to execute the readable program codes to check the received third identity authentication message comprising $N_A\|N_B\|Q_A\|Sig_A\|MacTag_A$ from the other apparatus upon reception of the third identity authentication message is further configured:

to check whether the random number $N_A$ in the received third identity authentication message is consistent with the lastly received random number $N_A$, and when they are not consistent, to determine that the third identity authentication message is incorrect as a result of the check;

to check whether the random number $N_B$ in the received third identity authentication message is consistent with the random number $N_B$ transmitted by the apparatus to the other apparatus, and when they are not consistent, to determine that the third identity authentication message is incorrect as a result of the check; and to verify $Sig_A$ using a public key $CP_A$ of the other apparatus to check the other apparatus for legality, and when the other apparatus is not legal, to determine that the third identity authentication message is incorrect as a result of the check, wherein the public key $CP_A$ of the other apparatus is comprised in the certificate $Cert_A$ of the other apparatus;

wherein when any one of the checks shows incorrectness, it is determined that the received $N_A\|N_B\|Q_A\|Sig_A\|MacTag_A$ is incorrect as a result of the check.

16. The apparatus according to claim 14, wherein the first identity authentication message is transmitted after being encapsulated in an Activation Request (ACT_REQ) protocol data unit, the second identity authentication message is transmitted after being encapsulated in an Activation Response (ACT_RES) protocol data unit, the third identity authentication message is transmitted after being encapsulated in a Verification Request (VEY_REQ) protocol data unit, and the fourth identity authentication message is transmitted after being encapsulated in a Verification Response (VEY_RES) protocol data unit, wherein ACT_REQ, ACT_RES, VEY_REQ, and VEY_RES are protocol data unit formats defined in accordance with the standard ISO/IEC 13157-1.

* * * * *

UNITED STATES PATENT AND TRADEMARK OFFICE
CERTIFICATE OF CORRECTION

PATENT NO. : 10,389,702 B2  
APPLICATION NO. : 15/122806  
DATED : August 20, 2019  
INVENTOR(S) : Hu et al.

Page 1 of 1

It is certified that error appears in the above-identified patent and that said Letters Patent is hereby corrected as shown below:

On the Title Page

Item (73):  
Assignee reads:  
CHINA IWNCOMM CO., LTD., Shaanci (CN)

Should read:  
CHINA IWNCOMM CO., LTD., Shaanxi (CN)

Signed and Sealed this  
Twenty-second Day of October, 2019

Andrei Iancu  
*Director of the United States Patent and Trademark Office*